Aug. 27, 1940.  C. ADLER, JR  2,212,490
AIRPLANE
Filed Jan. 4, 1939   2 Sheets-Sheet 1
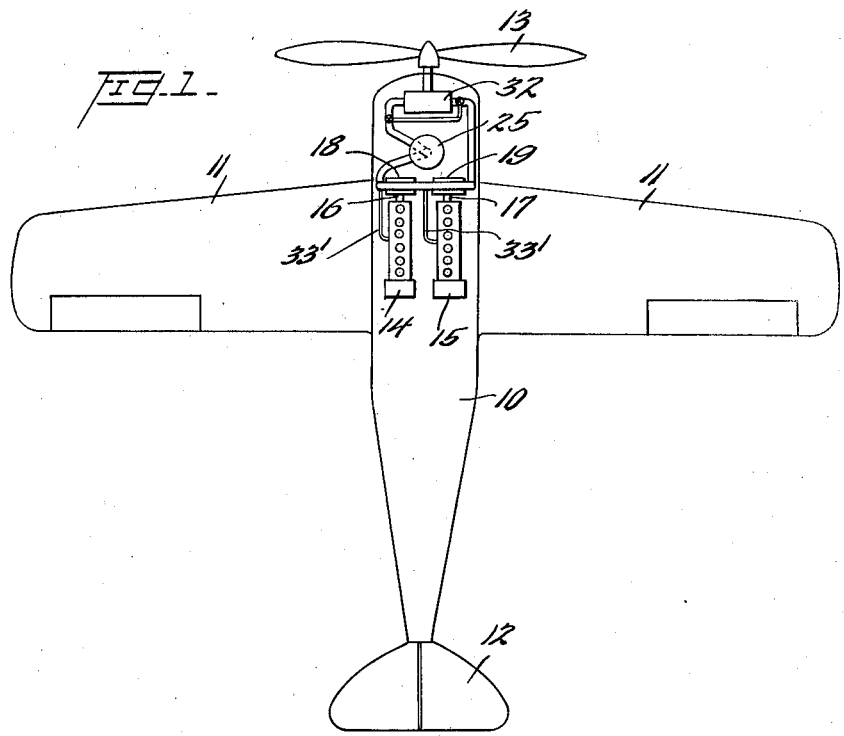
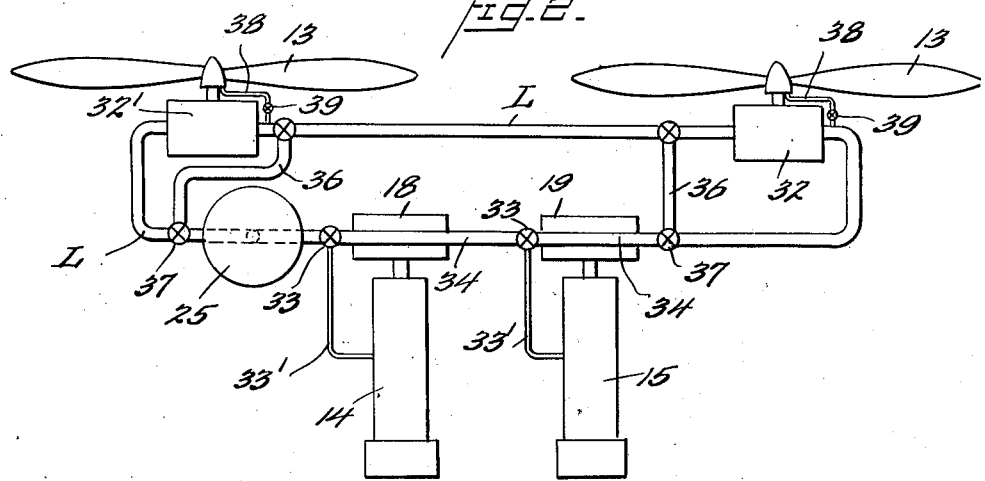
Inventor
Charles Adler, Jr., Aug. 27, 1940. C. ADLER, JR 2,212,490
AIRPLANE
Filed Jan. 4, 1939   2 Sheets-Sheet 2
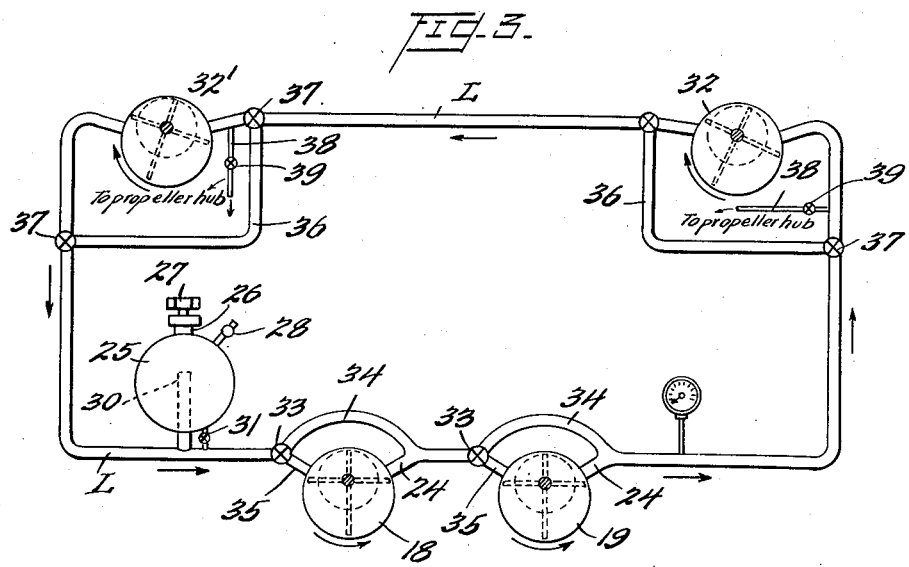
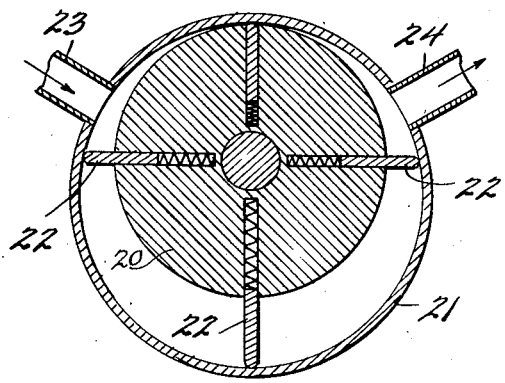
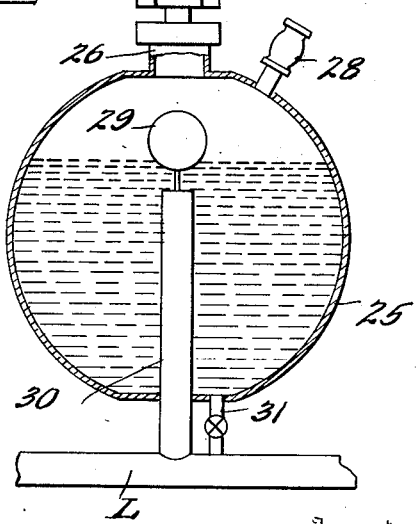
Inventor
Charles Adler, Jr.,
By Cushman Darby & Cushman
Attorneys Patented Aug. 27, 1940

2,212,490

UNITED STATES PATENT OFFICE 2,212,490

AIRPLANE

Charles Adler, Jr., Baltimore, Md.

Application January 4, 1939, Serial No. 249,288

8 Claims. (Cl. 244—53)

This invention relates to airplanes and has for its primary object to increase the safety factor as well as the flight range of the plane.

A particular object of the invention is to provide a construction in which the power plant consists of two or more prime movers, either or both of which are used to furnish the necessary motive power, and wherein should one of the motors fail, the stability and ease of control of the plane will be substantially unimpaired, and the power available will be sufficient to allow the plane to continue safely upon its course.

The provision of auxiliary means for affording a supplemental motive power in the event that the principal prime mover fails has been suggested, but such means are of limited character and suffice only to enable the plane to make an immediate landing.

The desirability of eliminating the hazard should a prime mover fail and of continuing the plane in flight is of far-reaching importance. However, the problem involved is complicated in that stability and control of the plane must be maintained on the one hand and the propeller or propellers must be revolved at a high R. P. M. on the other.

I have discovered that by associating with the prime movers a hydraulic transmission system, the advantageous results above set forth and which are required for safe and practical operation can be achieved. It is essential for efficient operation that the prime movers drive suitable hydraulic pumps which are located in series in the hydraulic line, and also in series in this line there is positioned the hydraulic motor or motors for driving the propeller or propellers as the case may be. I have determined that a series system is most efficient in connection with high R. P. M. internal combustion engines required for airplane use. With a series hydraulic system in accordance with this invention, should one of the motors fail while the plane is traveling at a cruising speed, the acceleration of the other prime mover will enable the propellers to operate at over seventy per cent of normal speed, and it is not necessary to make a forced landing.

A further object of the invention is to so position or dispose the prime movers with relation to the plane that should one motor fail, the stability and control of the plane is not substantially impaired. That is to say, the prime movers can be disposed side-by-side or in longitudinal alignment, and hence if one motor becomes inoperative, the stability of the plane does not change. This is contrasted to present bi-motor planes wherein should one propeller motor fail, the plane has a tendency to veer due to the fact that the driving forces are unbalanced, and thus the problem of control becomes an arduous one requiring an immediate landing.

In addition to the permanent balance obtained by having the prime movers and preferably the associated hydraulic pumps as well, centrally located as a unit, this also permits ready examination and repair of the parts during flight which, of course, is of considerable advantage both from the standpoint of safety and in allowing the plane to remain aloft.

A further object of the invention is to eliminate the use of mechanical drives and clutches and in fact, not only are complicated operating devices avoided, but the series hydraulic system requires only a minimum amount of line and thereby substantially reduces the weight to be lifted and carried.

Another feature of the invention is the provision of means which are preferably automatic but may be manual for by-passing fluid in the line around any of the pumps which may be inoperative by reason of the failure of the prime mover with which the particular pump is associated.

In addition to the foregoing features, the hydraulic apparatus includes means for automatically regulating the pitch of the propellers in accordance with the pressure of the fluid in the line.

Also, the invention further includes the provision of a fluid supply for the series hydraulic system of such construction that regardless of the angle or position of the plane, the hydraulic system will operate.

In the accompanying drawings:

Figure 1 is a plan view showing my improved construction in association with a plane having a single propeller, there being two prime movers and associated hydraulic pumps disposed in series with the hydraulic motor to drive the propeller shaft;

Figure 2 is a plan view of a similar system including a pair of propellers and also including the provision of means for accomplishing automatic hydraulic control of pitch and feathering of the propeller blades;

Figure 3 is a diagrammatic view of the transmission system used in the construction shown in Figure 2;

Figure 4 is a detail view of one of the hydraulic motors or pumps employed, and

Figure 5 is a detail view of the hydraulic fluid supply expansion tank.

Referring to Figure 1, the airplane is of usual construction including a fuselage 10, wings 11, tail 12, and propeller 13. Suitably mounted in the fuselage are a pair of internal combustion engines which may be of the Diesel type or the usual ignition type. In fact, any suitable prime mover may be employed. While I have illustrated two prime movers 14 and 15, it is to be understood that the number thereof may be increased as required for a particular plane construction.

It is to be noted that the prime movers are disposed immediately adjacent each other in the fuselage so that they are readily accessible and, moreover, being at the same location, the stability factor, as explained above, is substantially enhanced.

The prime movers drive through the shafts 16 and 17 respectively, hydraulic pumps 18 and 19 of the type shown in Figure 4.

Referring to Figure 4, each of these pumps includes the eccentrically mounted barrel 20 rotated by the prime mover shaft in the fixed casing 21. Each barrel carries a plurality of vanes 22 which, as shown in Figure 4, are constantly spring-projected outwardly to engage the wall of the casing 21 as the barrel and vanes are positively rotated. The inlet side of the pump is indicated at 23 and the outlet side at 24. This type of pump per se is well known, and while I consider it most efficient for my purpose, other types may be satisfactorily utilized.

The inlets 23 of each hydraulic pump are operatively connected with a hydraulic fluid expansion tank 25 as shown in Figure 5, through the line L as shown in Figure 3. This tank 25 includes a filling opening 26 provided with a suitable closure 27, a pressure relief valve 28, a fluid level indicator 29, and an outlet pipe 30 extending into the casing of the tank. A drain valve 31 is also associated with the tank, the outlet 30 and drain valve outlet communicating with the line L. By reason of this construction the tank is operable to supply fluid to the line regardless of the position of the plane.

Referring to Figure 1, the outlets 24 of the pumps lead through line L to a hydraulic motor 32 as shown in Figure 1, similar in construction to the pump shown in Figure 4 and which operates the shaft upon which the propeller 13 is mounted. From this last mentioned motor the line returns to one of the pumps 18, 19 and this line as stated has communication with the tank 25, i. e., the tank is in series with line L. In the construction just described, the hydraulic system includes the line L having the pumps 18, 19 and the hydraulic propeller motor 32 in series. For a more specific understanding of the line, reference is had to Figures 2 and 3 where the construction is the same except that for purposes of illustration the system has been disclosed in connection with a plurality of propellers and associated motors, in the present instances two.

Referring to Figures 2 and 3, the pumps 18 and 19 are driven independently from the prime movers to force the fluid to the right, and it is to be noted that the fluid passes in the line from the pump 18 through the pump 19 to the hydraulic motor 32 for one propeller 13 and through the first motor to the second hydraulic motor 32' for the other propeller 13. Suitable valves 33 are interposed in the line L adjacent the hydraulic pumps 18, 19 so that if one of the pumps is rendered inoperative by reason of failure of its prime mover 14 or 15, the particular valve 33 will be opened either manually or automatically to by-pass the fluid about the inoperative hydraulic pump through the by-pass line 34, and at the same time close the pipe 35 to the passage of fluid to the inoperative pump. I have discovered that by reason of this construction the driving power imparted to the propellers is not sufficiently impaired in the case of a failure, as to require that the plane be immediately landed, but on the other hand the efficiency remains above seventy per cent.

This series construction enables a relatively light hydraulic conduit system to be utilized and with reference to the valves 33 the automatic control thereof may be accomplished in several ways. For example, they may be rendered sensitive to the revolutions of a governor associated with the prime mover shaft or to the vacuum system of the internal combustion engine, or to the ignition system thereof by means of a suitable connection or conduit 33'.

The construction shown in Figures 2 and 3 will apply when the number of propellers is increased in that it is simply necessary to include in the line a suitable number of hydraulic motors. From the last motor 32', the fluid circulates back to the pumps as will be apparent.

I have illustrated in association with the propeller motors, by-pass pipes 36 having suitable valves 37, in the remote event that it may be necessary to cut out one of the propellers.

There is included in the line, preferably adjacent each of the propeller motors, hydraulic lines 38 to control by means of varying pressure in the hydraulic system either electrical or hydraulic standard mechanism for varying the pitch and feathering of the propeller blades. As will be appreciated, this control is entirely automatic. If desired, suitable valves 39 may be included in lines 38 for adjusting the pressure which in some cases may be necessary and such valves may be either manual or automatic.

The improved airplane construction hereinabove described, very substantially increases the safety factor and it is to be noted that the construction is devoid of complicated mechanical drives and clutch mechanisms.

The hydraulic fluid employed can be a suitable light lubricating oil or glycerine.

The prime movers, their associated pumps, and the fluid expansion tank are preferably all supported in balanced relation in the fuselage where they are readily accessible, and only so much of the line extends from the fuselage as is necessary to include the propeller motors which are preferably located adjacent the propeller mountings. This construction enables full advantage to be taken, particularly of the series hydraulic system and promotes stability and lightness and also solves a heretofore difficult problem of insuring absolute safety in the event of engine failure.

I claim:

1. In an airplane having laterally extending wings, a fuselage, a plurality of prime movers carried by the fuselage, a plurality of hydraulic pumps each independently driven by one of said prime movers, a line communicating with said pumps and including a hydraulic motor, said motor driving a propeller, and means for continuing the rotation of the propeller should one of the prime movers fail.

2. In an airplane having laterally extending wings, a fuselage, a plurality of prime movers carried by the fuselage, a plurality of hydraulic pumps each independently driven by one of said prime movers, a line communicating with said pumps and including a plurality of hydraulic motors, said motors mounted on the wings and each motor driving a propeller, and means for continuing the rotation of the propellers should one of the prime movers fail.

3. An airplane according to claim 1 in which the pumps and motors are connected in series in the line.

4. An airplane in accordance with claim 2 in which the pumps and motors are mounted in series in the line.

5. An airplane according to claim 1 in which the feathering and pitch of the propeller blades is controlled by the pressure in the line.

6. An airplane in accordance with claim 1 in which by-pass means are associated in the line adjacent each pump for by-passing fluid around a pump whose prime mover is inoperative.

7. An airplane in accordance with claim 1 in which by-pass means are associated in the line adjacent each pump for automatically by-passing fluid around a pump whose prime mover is inoperative.

8. An airplane in accordance with claim 1 in which a plurality of prime movers and associated hydraulic pumps and a fluid expansion tank for the hydraulic system are all disposed in balanced relation in the fuselage of the airplane and connected in series in the line of the hydraulic system, said line extending to points adjacent the propeller mountings and with the propeller hydraulic motors connected in series in the line at such points.

CHARLES ADLER, JR.